(12) United States Patent
Yosoku et al.

(10) Patent No.: US 10,788,567 B2
(45) Date of Patent: Sep. 29, 2020

(54) RADAR APPARATUS AND RADAR METHOD

(71) Applicant: Panasonic Corporation, Osaka (JP)

(72) Inventors: Naoya Yosoku, Kanagawa (JP); Takaaki Kishigami, Kanagawa (JP)

(73) Assignee: Panasonic Corporation, Osaka (JP)

( * ) Notice: Subject to any disclaimer, the term of this patent is extended or adjusted under 35 U.S.C. 154(b) by 545 days.

(21) Appl. No.: 15/455,884

(22) Filed: Mar. 10, 2017

(65) Prior Publication Data

US 2017/0269191 A1    Sep. 21, 2017

(30) Foreign Application Priority Data

Mar. 16, 2016  (JP) ................................ 2016-052210

(51) Int. Cl.
  *G01S 7/28*   (2006.01)
  *G01S 7/282*  (2006.01)
  (Continued)

(52) U.S. Cl.
  CPC .............. *G01S 7/282* (2013.01); *G01S 7/288* (2013.01); *G01S 13/284* (2013.01);
  (Continued)

(58) Field of Classification Search
  CPC ........ G01S 13/10; G01S 13/106; G01S 13/12; G01S 13/22; G01S 13/222; G01S 13/225; G01S 13/227; G01S 13/26; G01S 13/284; G01S 13/30; G01S 7/28; G01S 7/2813; G01S 7/2806; G01S 7/282; G01S 17/10;
  (Continued)

(56) References Cited

U.S. PATENT DOCUMENTS

| 4,937,580 A * | 6/1990 | Wills .................. G01S 13/0209 342/22 |
| 5,440,311 A * | 8/1995 | Gallagher ............. G01S 13/284 342/132 |
| 5,938,611 A * | 8/1999 | Muzilla ............... G01S 7/52047 600/455 |
| 2013/0120185 A1* | 5/2013 | Kishigami ............ G01S 7/2813 342/146 |

(Continued)

FOREIGN PATENT DOCUMENTS

| JP | 2013-029402 A | 2/2013 |
| WO | 2014/129142 A1 | 8/2014 |
| WO | WO2014/14132581 | * 9/2014 ............. G01S 13/28 |

OTHER PUBLICATIONS

Eric Spano et al., "Sequences of Complementary Codes for the Optimum Decoding of Truncated Ranges and High Sidelobe Suppression Factors for ST/MST Radar Systems", IEEE Trans. on Geoscience and Remote Sensing, vol. 34, No. 2, Mar. 1996.
(Continued)

*Primary Examiner* — Olumide Ajibade Akonai
(74) *Attorney, Agent, or Firm* — Seed IP Law Group LLP

(57) ABSTRACT

A radar apparatus is provided which includes a counter which counts a transmission count of pulse codes from start of measurement, a pulse code generator which selects a complementary group from among a plurality of complementary groups obtained by grouping a plurality of pulse codes generated by at least one code coupling process on at least one basic code pair as complementary codes every time the transmission count is an integral multiple of a code count in the plurality of complementary groups, and a transmitter which transmits the pulse codes belonging to the selected complementary group.

8 Claims, 17 Drawing Sheets

(51) Int. Cl.
*G01S 7/288* (2006.01)
*G01S 13/28* (2006.01)
*G01S 7/52* (2006.01)
*G01S 13/10* (2006.01)

(52) U.S. Cl.
CPC ......... *G01S 7/52025* (2013.01); *G01S 13/103* (2013.01); *G01S 13/106* (2013.01)

(58) Field of Classification Search
CPC .. G01S 13/885; G01S 15/8961; G01S 13/288; G01S 13/103; G01S 15/8959; G01S 7/52047; G01S 7/288; G01S 7/52025; G01S 7/52093; H04L 5/0021; H04L 13/0014
See application file for complete search history.

(56) References Cited

U.S. PATENT DOCUMENTS

| 2013/0176166 A1* | 7/2013 | Kishigami | G01S 7/023 342/202 |
| 2014/0111367 A1* | 4/2014 | Kishigami | G01S 13/103 342/21 |
| 2015/0048967 A1 | 2/2015 | Morita et al. | |
| 2015/0123840 A1* | 5/2015 | Morita | G01S 7/02 342/175 |

OTHER PUBLICATIONS

Notice of Reasons for Refusal in Japan dated Sep. 24, 2019 for the related Japanese Patent Application No. 2016-052210.

* cited by examiner

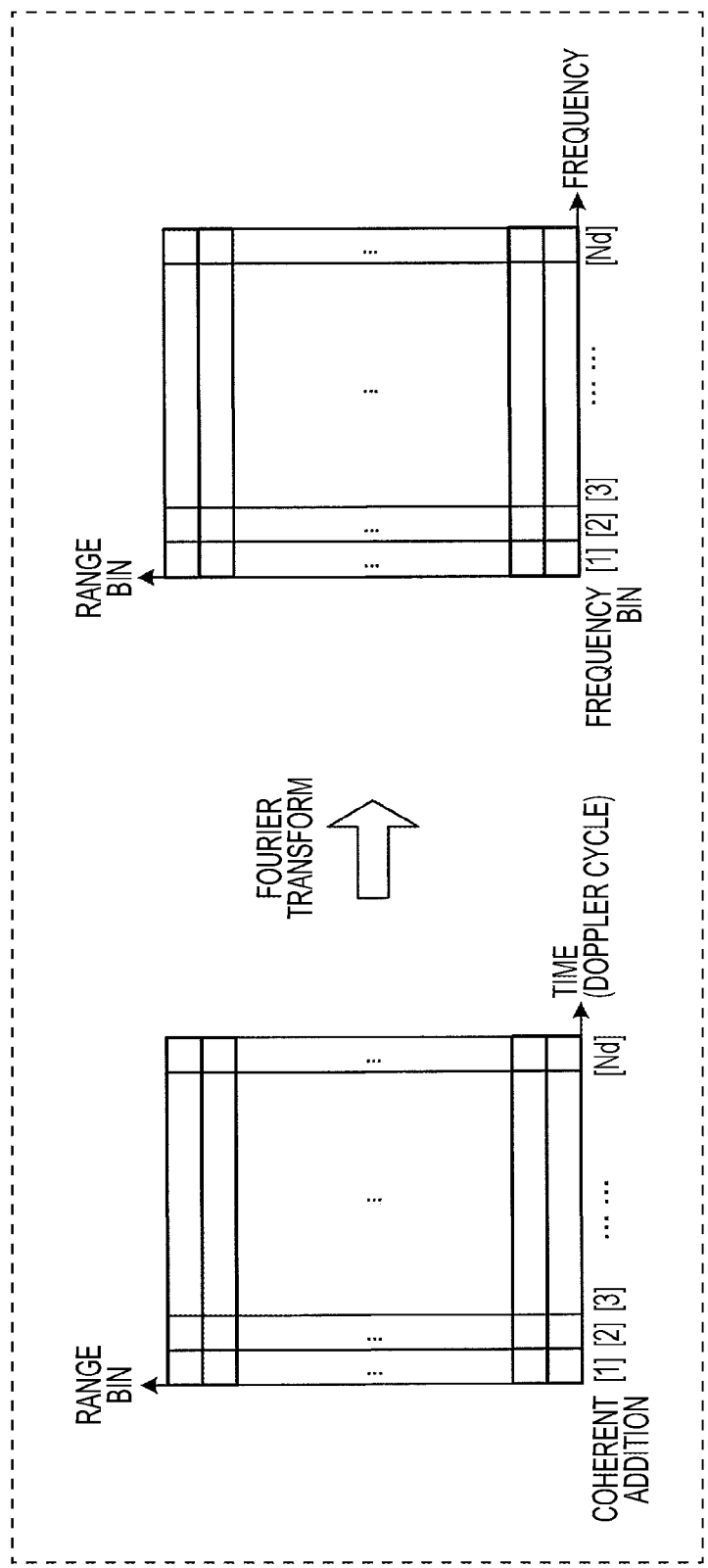

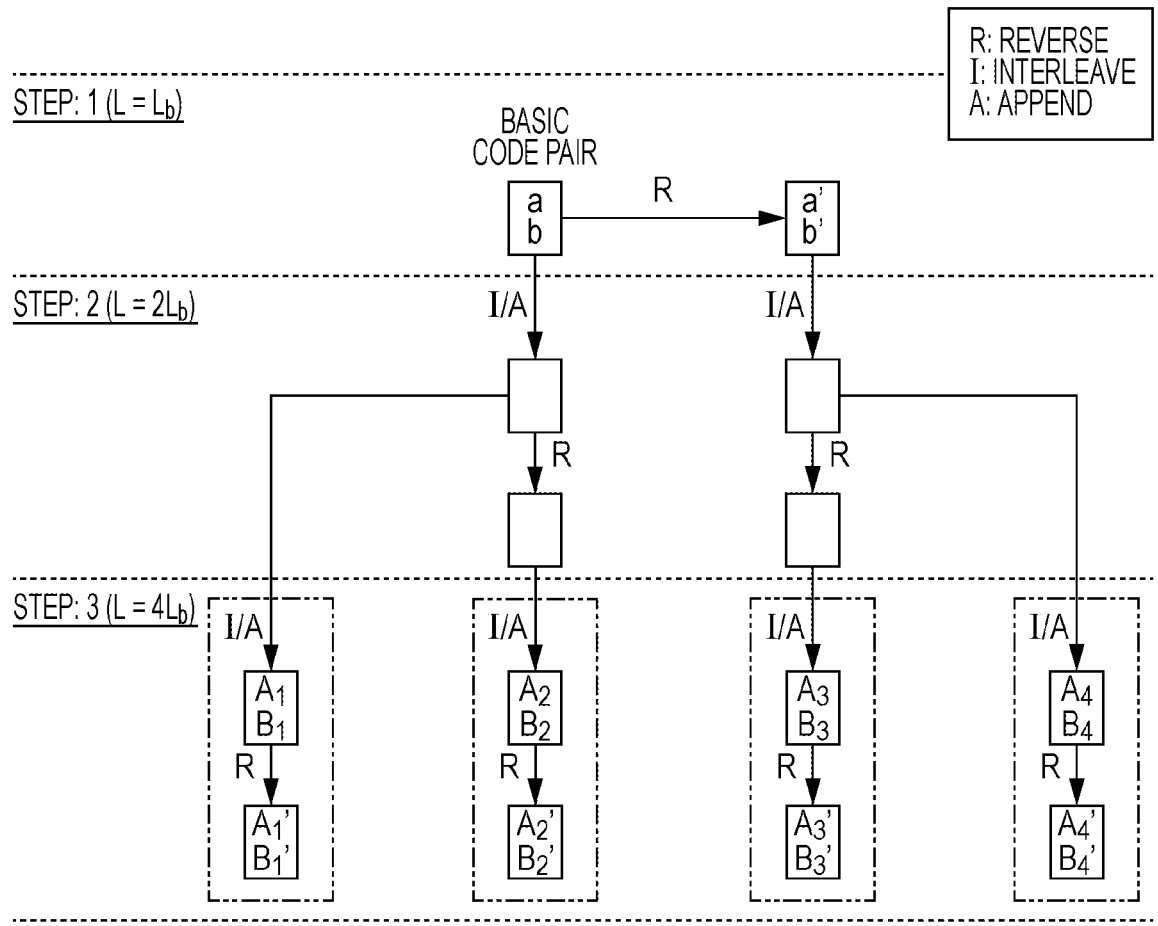

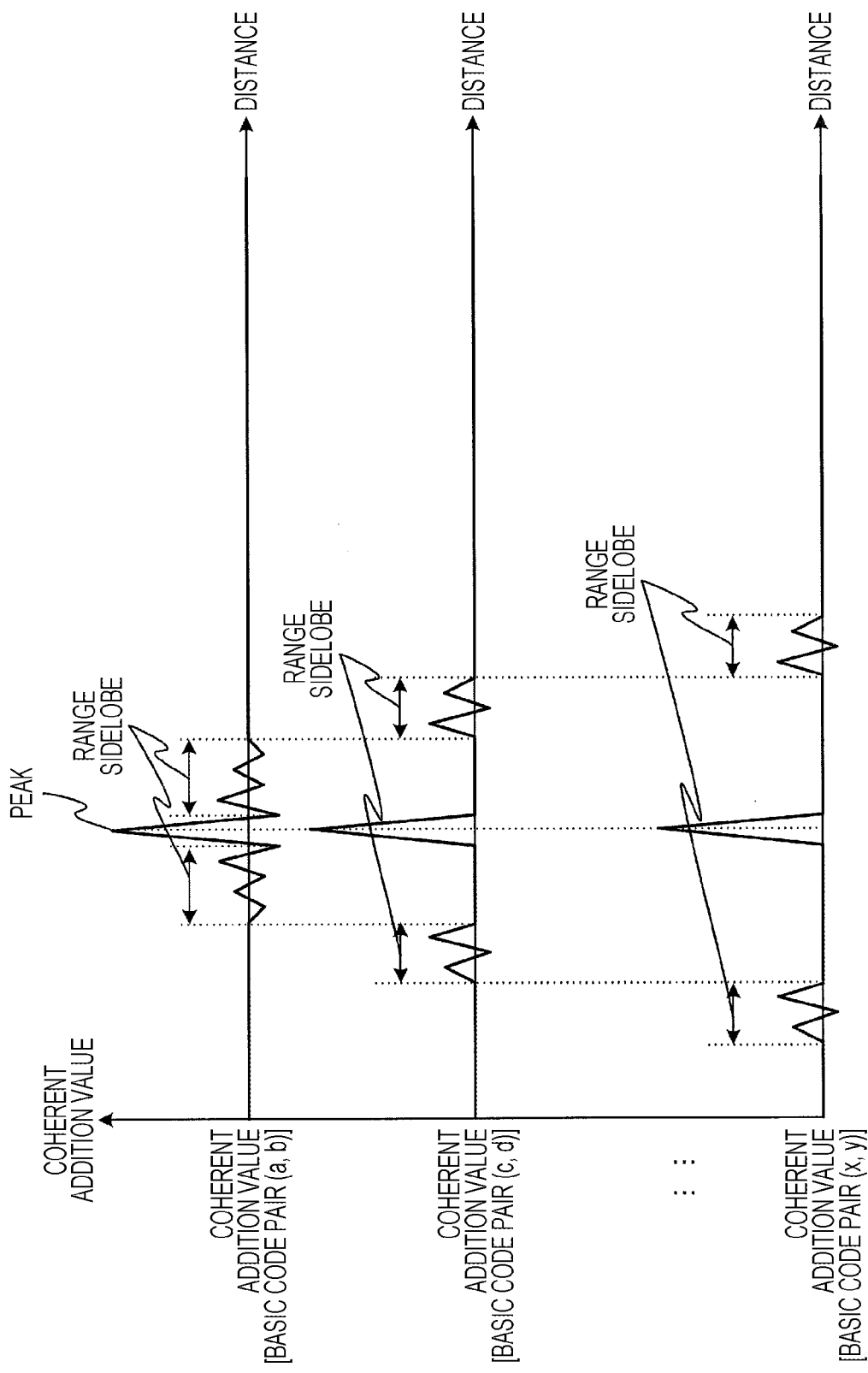

RADAR APPARATUS AND RADAR METHOD

BACKGROUND

1. Technical Field

The present disclosure relates to a radar apparatus and radar method.

2. Description of the Related Art

Conventionally, various techniques regarding pulse Doppler radars have been suggested (for example, refer to Japanese Unexamined Patent Application Publication No. 2013-29402).

A radar apparatus disclosed in Japanese Unexamined Patent Application Publication No. 2013-29402 improves a signal-to-noise ratio (SNR) in reception by performing a pulse compressing process and coherent addition of a received echo signal. Furthermore, the radar apparatus extracts a Doppler frequency component of the echo signal by performing a Doppler filtering process, and estimates a moving speed of a target from the obtained Doppler frequency component. Also, by detecting a peak waveform obtained by pulse compression of the echo signal, the radar apparatus estimates a delay time from pulse transmission to echo reception, and converts the estimated delay time into a distance to the target.

SUMMARY

One non-limiting and exemplary embodiment facilitates providing a radar apparatus and radar method capable of reducing noise after Doppler analysis.

In one general aspect, the techniques disclosed here feature a radar apparatus including a counter which counts a transmission count of pulse codes from start of measurement, a pulse code generator which selects a complementary group from among a plurality of complementary groups obtained by grouping a plurality of pulse codes generated by at least one code coupling process on at least one basic code pair as complementary codes every time the transmission count is an integral multiple of a code count in the plurality of complementary groups, and a transmitter which transmits the pulse codes belonging to the selected complementary group.

In another general aspect, the techniques disclosed here feature a radar method including counting a transmission count of pulse codes from start of measurement, selecting a complementary group from among a plurality of complementary groups obtained by grouping a plurality of pulse codes generated by at least one code coupling process on at least one basic code pair as complementary codes every time the transmission count is an integral multiple of a code count in the plurality of complementary groups, and transmitting the pulse codes belonging to the selected complementary group.

It should be noted that general or specific embodiments may be implemented as a system, a method, an integrated circuit, a computer program, a storage medium, or any selective combination thereof.

According to the present disclosure, noise after Doppler analysis can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 depicts an example of a Doppler analyzing process according to one embodiment of the present disclosure;

FIG. 6A depicts an example of a code coupling process according to one embodiment of the present disclosure;

FIG. 6B depicts an example of complementary groups according to one embodiment of the present disclosure;

FIG. 11 depicts an example of a coherent addition value for each basic code pair according to one embodiment of the present disclosure;

DETAILED DESCRIPTION

A general radar apparatuses simultaneously measures a distance to a target and a moving speed of the target by a receiving process (including, for example, a pulse compressing process) on a received echo signal.

The pulse compressing process is performed by cross correlation between an echo signal and a pulse code. However, depending on the pulse code for use by the radar apparatus, a sidelobe component (range sidelobe) of a cross-correlation waveform may not be zero. When a range sidelobe occurs in a situation such that a plurality of targets are present, there is a high probability that the radar apparatus erroneously detects a peak, and it becomes difficult to correctly estimate a distance to the target.

Eric Spano, et. al., "Sequences of Complementary Codes for the Optimum Decoding of Truncated Ranges and High Sidelobe Suppression Factors for ST/MST Radar Systems", IEEE Trans. on Geoscience and Remote Sensing, vol. 34, No. 2, March, 1996 discloses a technique of suppressing a range sidelobe. Codes described in the above cited document "Sequences of Complementary Codes for the Optimum Decoding of Truncated Ranges and High Sidelobe Suppression Factors for ST/MST Radar Systems" have a property that a range sidelobe is suppressed by coherent addition of an autocorrelation value of codes in a complementary relation (hereinafter referred to as "complementary codes"). Furthermore, the range sidelobe suppressing performance is maximum when autocorrelation values of codes generated from one code pair (hereinafter referred to as a "basic code pair") formed of complementary codes are all subjected to coherent addition. The codes may be referred to as Spano codes by using one of the authors of the above cited document "Sequences of Complementary Codes for the Optimum Decoding of Truncated Ranges and High Sidelobe Suppression Factors for ST/MST Radar Systems".

Here, it is assumed that Spano codes are used for the above-described pulse Doppler radar. Required specifications of the pulse Doppler radar include a measurement range and Doppler resolution. The measurement range is a value determined by a pulse repetition interval (PRI). The Doppler resolution is a value determined by a sample rate of data inputted to a Doppler filter and data quantity.

Depending on the required specifications of the measurement range and Doppler resolution, in general radar apparatuses, a coherent addition count may have to be made smaller than a total Spano code count to be transmitted. In this case, it is difficult to obtain a maximum performance in suppressing a range sidelobe by Spano codes. Moreover, since the amplitude and phase of a range sidelobe not sufficiently suppressed fluctuate with time cyclically, noise occurs in Doppler filter outputs.

Figure 1A:
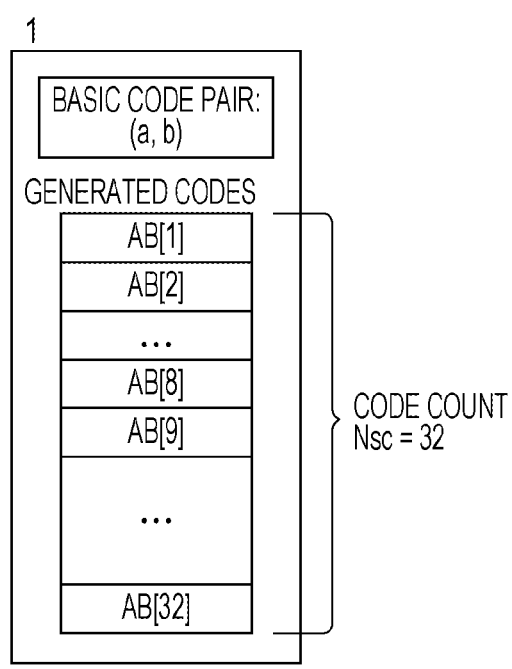
FIG. 1A depicts an example of one basic code pair.
Figure 1B:
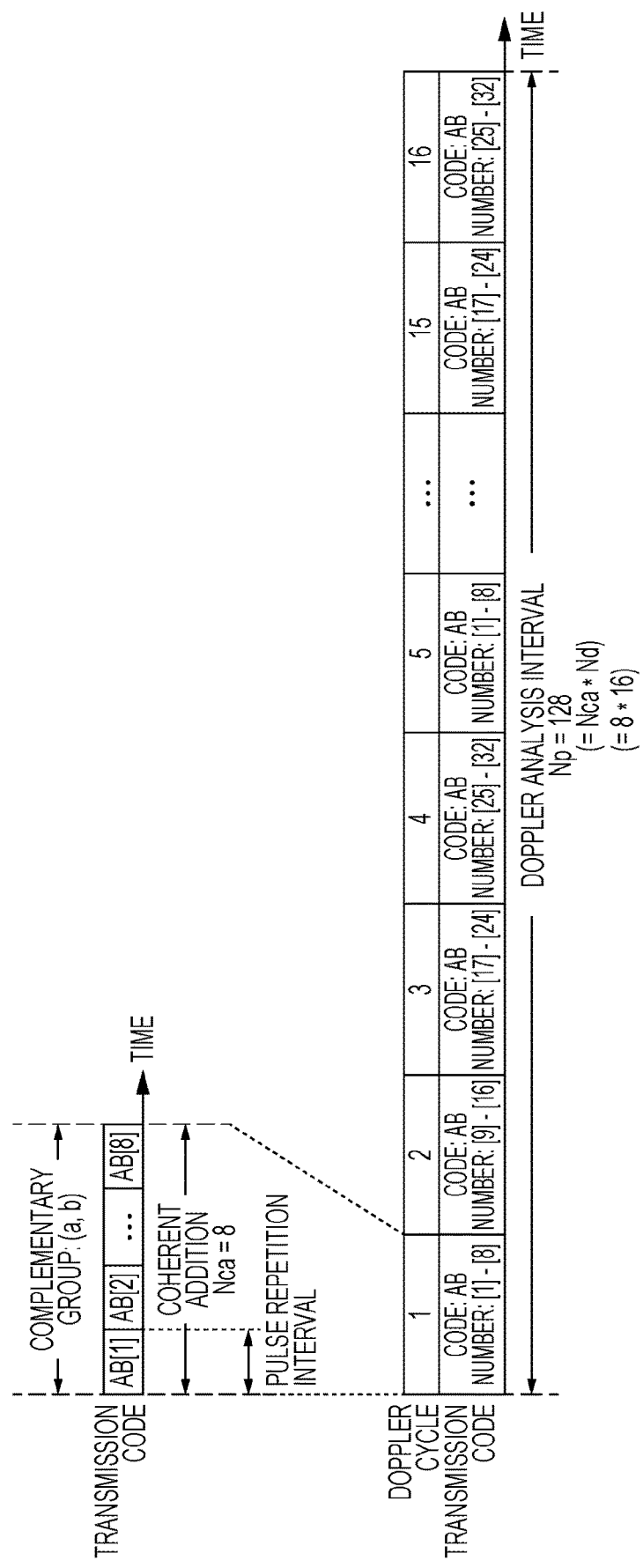
FIG. 1B depicts an example of a pulse code transmitting process using one basic code pair.
Figure 2:
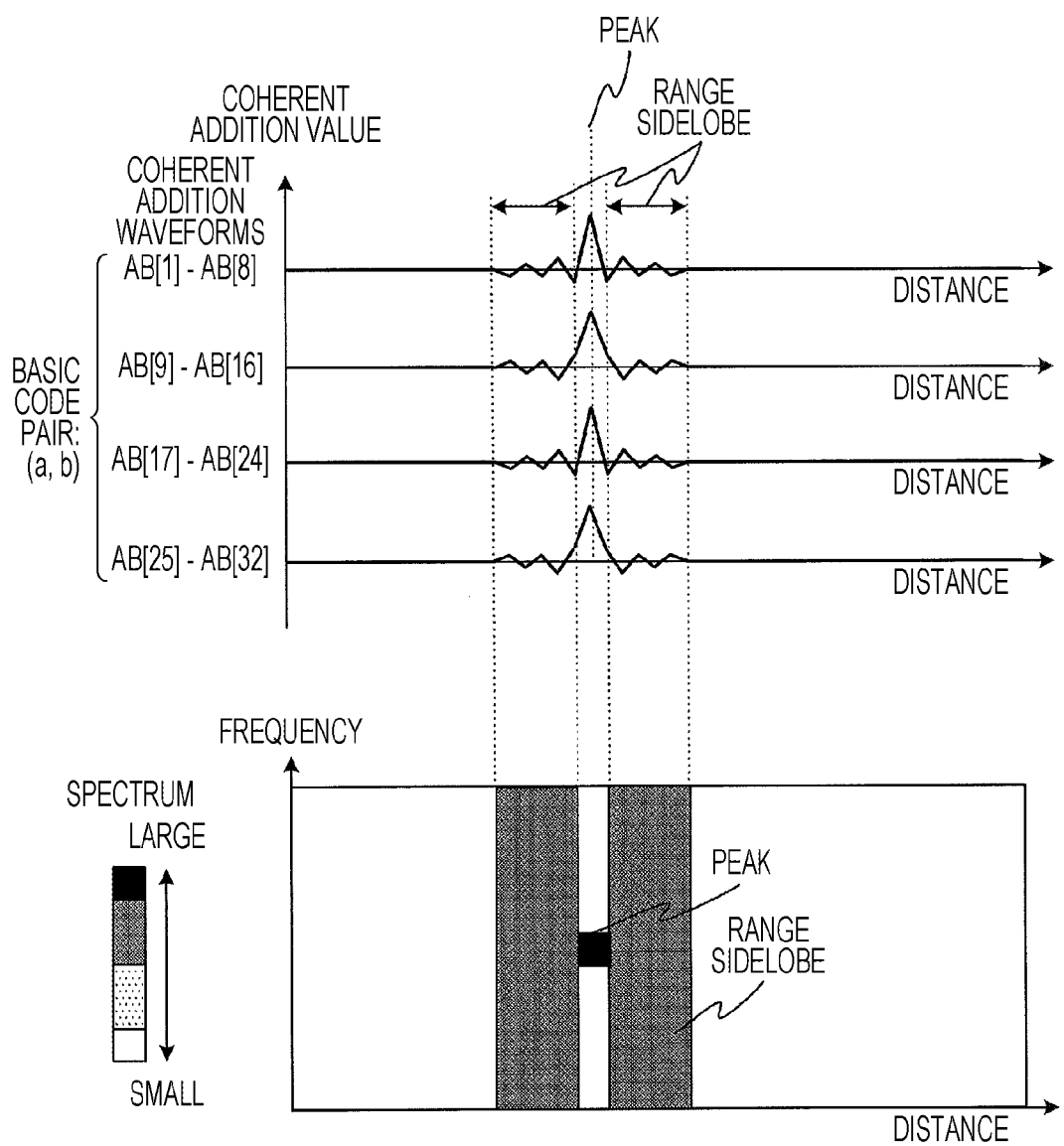
FIG. 2 depicts an example of a coherent addition value when one basic code pair is used.

An example of operation of a general radar apparatus is described by using FIG. 1A, FIG. 1B, and FIG. 2.

FIG. 1A depicts one basic code pair (a, b) and a group (hereinafter may be referred to as "complementary group) of codes AB generated from the basic code pair (a, b). FIG. 1B depicts an example of a transmission sequence of the pulse codes using the codes AB of FIG. 1A.

In FIG. 1A and FIG. 1B, a code count Nsc of codes generated from the basic code pair (a, b) is 32, a coherent addition count Nca is 8, and a Doppler cycle count Nd is 16. That is, the coherent addition count Nca is smaller than the code count Nsc.

FIG. 2 depicts an example of a target Doppler signal obtained by the radar apparatus performing a receiving process on the pulse codes transmitted in accordance with the transmission sequence depicted in FIG. 1B. In FIG. 2, for a target Doppler signal, the horizontal axis represents distance, the vertical axis represents frequency, and degrees of magnitude of spectrums obtained by frequency analysis are represented as color fills.

Since the radar apparatus performs coherent addition of autocorrelation values of pulse codes, the number of which being same as the coherent addition count Nca=8, as depicted in FIG. 2, it is difficult to suppress all range sidelobes. Moreover, in FIG. 2, range sidelobes of each waveform (coherent addition waveform) obtained by coherent addition of correlation results of pulse codes each generated from the basic code pair (a, b) of FIG. 1A occur unevenly to a specific range bin. Since the radar apparatus performs Doppler analysis on these coherent addition waveforms, range sidelobe components unevenly occurring to a specific range bin are extracted as large frequency spectrum components.

Thus, one embodiment of the present disclosure is to reduce noise after Doppler analysis and detect a target with high accuracy.

In the following, an embodiment of the present disclosure is described in detail with reference to the drawings.

<Structure of Radar Apparatus>

First, the structure of a radar apparatus according to the present embodiment is described.

Figure 3:
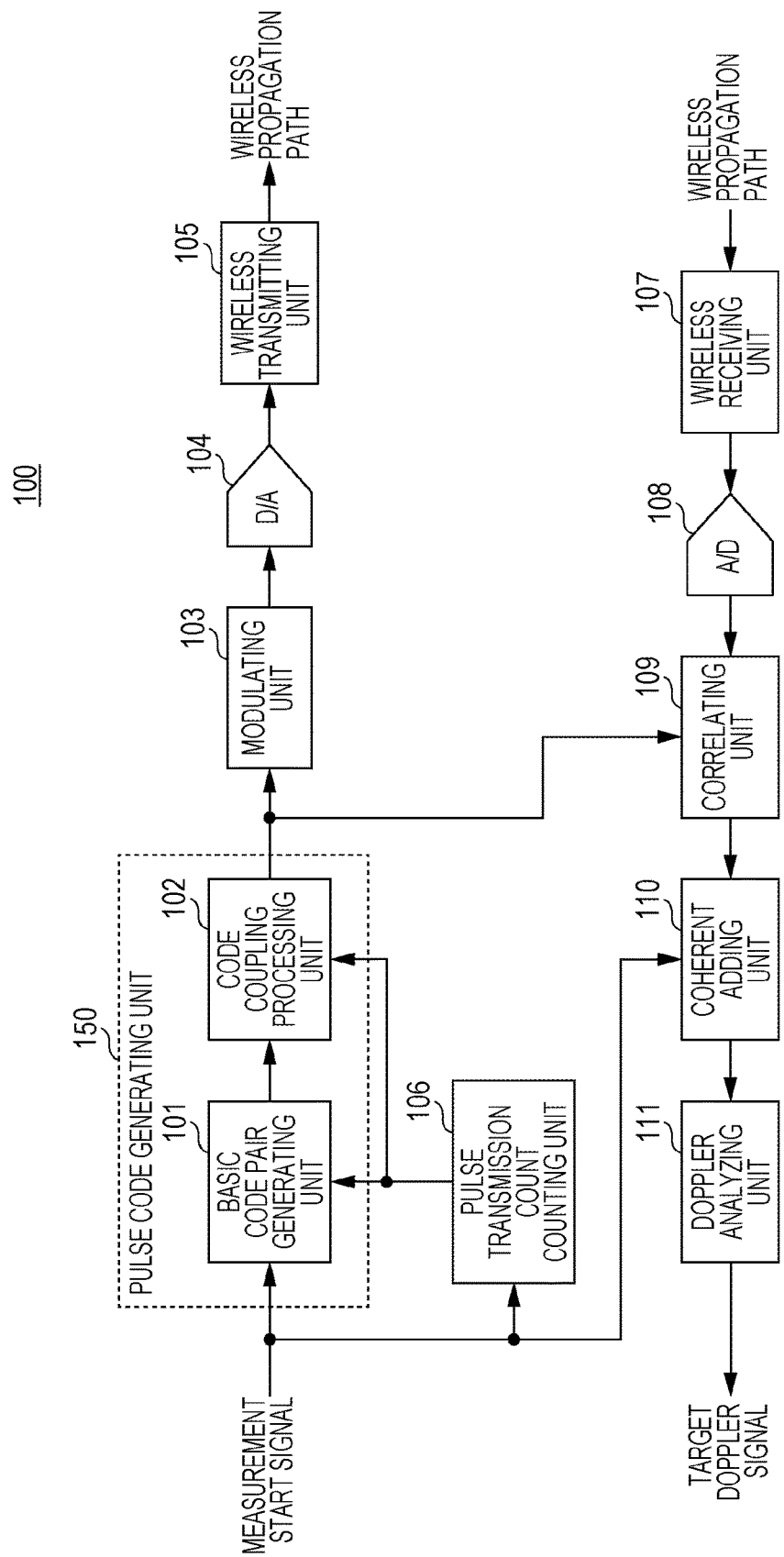
FIG. 3 depicts an example of structure of a radar apparatus according to one embodiment of the present disclosure.

FIG. 3 depicts an example of structure of the radar apparatus according to the present embodiment.

In FIG. 3, the radar apparatus 100 performs a process of transmitting a radar signal (pulse codes) to a wireless propagation path and a process of receiving an echo signal of a radar signal reflected from a target. Also, upon receiving an input of a measurement start signal representing a start of measurement, the radar apparatus 100 starts processes regarding transmission and reception.

The radar apparatus 100 includes a basic code pair generating unit 101, a code coupling processing unit 102, a modulating unit 103, a digital-to-analog (D/A) converting unit 104, a wireless transmitting unit 105, a pulse transmission count counting unit 106, a wireless receiving unit 107, an analog-to-digital (A/D) converting unit 108, a correlating unit 109, a coherent adding unit 110, and a Doppler analyzing unit 111.

The pulse transmission count counting unit 106 counts a transmission count of pulse codes transmitted from the radar apparatus 100 after a measurement start signal is inputted. The pulse transmission count counting unit 106 outputs the counted pulse transmission count to the basic code pair generating unit 101 and the code coupling processing unit 102.

The basic code pair generating unit 101 and the code coupling processing unit 102 are included in a pulse code generating unit 150. The pulse code generating unit 150 selects a different complementary group from among a plurality of complementary groups obtained by grouping a plurality of pulse codes generated by a code coupling process on the basic code pair as complementary codes every time the transmission count counted by the pulse transmission count counting unit 106 is an integral multiple of a code count in the complementary groups.

Specifically, when a measurement start signal is inputted, the basic code pair generating unit 101 starts a process of generating a basic code pair. Here, the basic code pair represents a pair of complementary codes serving as a basis in pulse code generation. In accordance with the pulse transmission count inputted from the pulse transmission count counting unit 106, the basic code pair generating unit 101 changes a basic code pair to be generated. The basic code pair generating unit 101 outputs the generated basic code pair to the code coupling processing unit 102.

The code coupling processing unit 102 performs a code coupling process on the basic code pair inputted from the basic code pair generating unit 101. Note that the code coupling processing unit 102 changes the code coupling process in accordance with the pulse transmission count inputted from the pulse transmission count counting unit 106. The code coupling processing unit 102 outputs the pulse codes after the code coupling process to the modulating unit 103 and the correlating unit 109. Note that details of the code coupling process in the code coupling processing unit 102 will be described further below.

The modulating unit 103 performs a digital modulating process on the pulse codes inputted from the code coupling processing unit 102. As a digital modulating process, for example, phase modulation by binary phase shift keying (BPSK) modulation is used. The modulating unit 103 outputs the digital modulated signal after modulation to the D/A converting unit 104.

The D/A converting unit 104 converts the digital modulated signal inputted from the modulating unit 103 into an analog modulated signal, and outputs the analog modulated signal to the wireless transmitting unit 105.

The wireless transmitting unit 105 converts the analog modulated signal inputted from the D/A converting unit 104 from a baseband to a wireless frequency band, and outputs the wireless signal to a wireless propagation path after the conversion.

The wireless signal outputted from the radar apparatus 100 is reflected by the target, and is received by the radar apparatus 100 as an echo signal.

The wireless receiving unit 107 receives the echo signal from the wireless propagation path. The wireless receiving unit 107 converts the received echo signal from the wireless frequency band to the baseband, and outputs the signal to the A/D converting unit 108 as an analog reception signal.

The A/D converting unit 108 converts the analog reception signal inputted from the wireless receiving unit 107 into a digital reception signal, and outputs the digital reception signal to the correlating unit 109.

The correlating unit 109 performs a cross-correlating process on the digital reception signal inputted from the A/D converting unit 108 and the pulse codes used for transmission and inputted from the code coupling processing unit 102. The correlating unit 109 outputs a correlation signal after the cross-correlating process to the coherent adding unit 110.

The coherent adding unit 110 performs coherent addition of the correlation signal inputted from the correlating unit 109 in synchronization with the pulse repetition interval. The coherent adding unit 110 adjusts synchronization with the pulse repetition interval with reference to the measurement start signal. The coherent adding unit 110 counts a coherent addition count, and performs coherent addition as many as a predetermined coherent addition count (Nca) of the radar apparatus 100. The coherent adding unit 110 outputs a coherent addition signal as a coherent addition result to the Doppler analyzing unit 111.

Figure 4A:
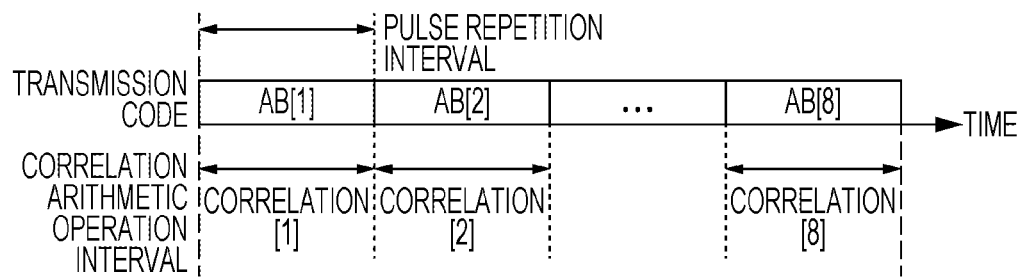
FIG. 4A depicts an example of transmission codes and a correlation arithmetic operation interval according to one embodiment of the present disclosure.
Figure 4B:
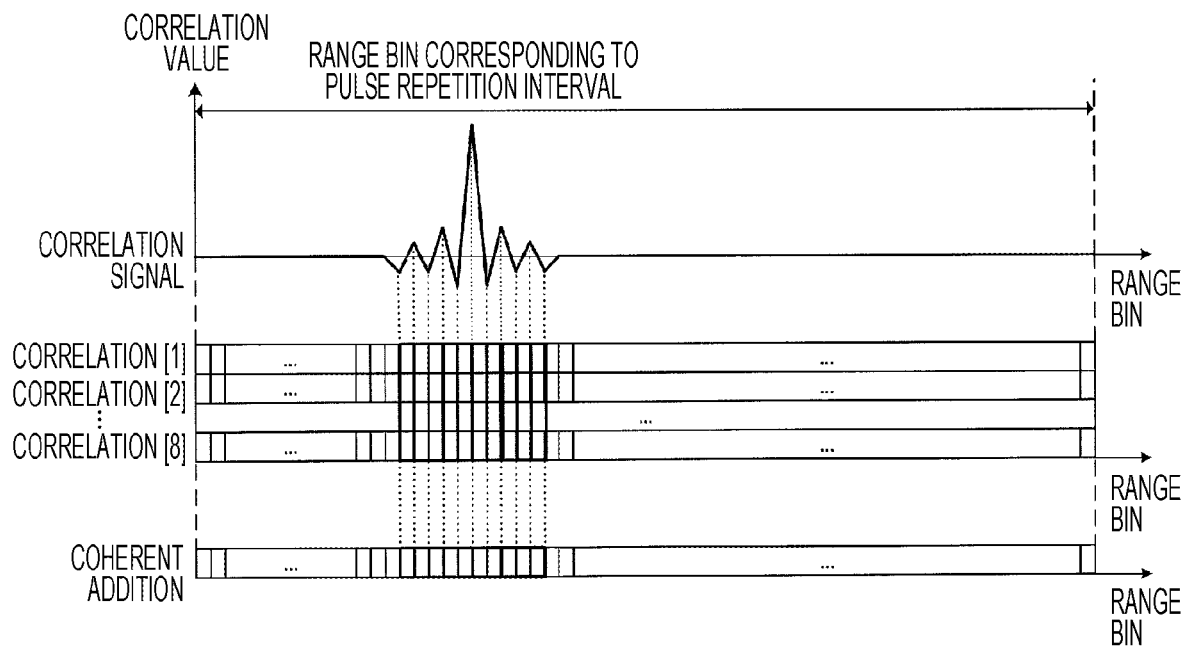
FIG. 4B depicts an example of a coherent adding process according to one embodiment of the present disclosure.

FIG. 4A and FIG. 4B depict a general outline of processes in the correlating unit 109 and the coherent adding unit 110. Correlations [1] to [8] in FIG. 4A represent data after a correlation process on transmission codes AB[1] to AB[8] by the correlating unit 109. In FIG. 4B, data stored in respective range bins of correlations [1] to [8] are waveform data of correlation signals. When the coherent addition count is 8 (Nca=8), the result of addition of the same range bin data of correlations [1] to [8] in the coherent adding unit 110 is a coherent addition signal.

The Doppler analyzing unit 111 performs Doppler frequency analysis on the coherent addition signal inputted from the coherent adding unit 110. The Doppler analyzing unit 111 accumulates coherent addition signals for a predetermined Doppler cycle count (Nd) of the radar apparatus 100 in a memory. The Doppler analyzing unit 111 performs Fourier transform (for example, fast Fourier transform (FFT)) for each range bin of the coherent addition signal for conversion into a Doppler frequency spectrum. The Doppler analyzing unit 111 outputs the Doppler frequency spectrum obtained by conversion (target Doppler signal).

FIG. 5 depicts a general outline of process of the Doppler analyzing unit 111. In FIG. 5, the Doppler analyzing unit 111 arranges coherent addition signals [1] to [Nd] on a Doppler cycle axis, and performs Fourier transform in a Doppler cycle direction in each range bin. As a result of Fourier transform, the Doppler analyzing unit 111 obtains Doppler frequency spectrum data with the Doppler cycle axis (time axis) converted into a frequency axis. The frequency bin is [1] to [Nd].

Note that a pulse code count Np of pulse codes transmitted by the radar apparatus 100 is Np=Nca×Nd.

Also, in the radar apparatus 100, the processes of the basic code pair generating unit 101 and the code coupling processing unit 102 configuring the pulse code generating unit 150 may be achieved by a storage apparatus. That is, the pulse code generating unit 150 may store pulse codes obtained as a result of the basic code pair generating process by the basic code pair generating unit 101 and the code coupling process by the code coupling processing unit 102 in a storage apparatus. The pulse code generating unit 150 may select, from the storage apparatus, pulse codes corresponding to the pulse transmission count inputted from the pulse transmission count counting unit 106, and may transmit the selected pulse codes.

<Code Coupling Process>

FIG. 6A depicts an example of a code coupling process in the code coupling processing unit 102. In FIG. 6A, a code length (L) of a code included in the basic code pair is $L=L_b$. FIG. 6B depicts a plurality of groups (complementary groups) obtained by grouping a plurality of pulse codes generated by a code coupling process on the basic code pair.

Figure 7:
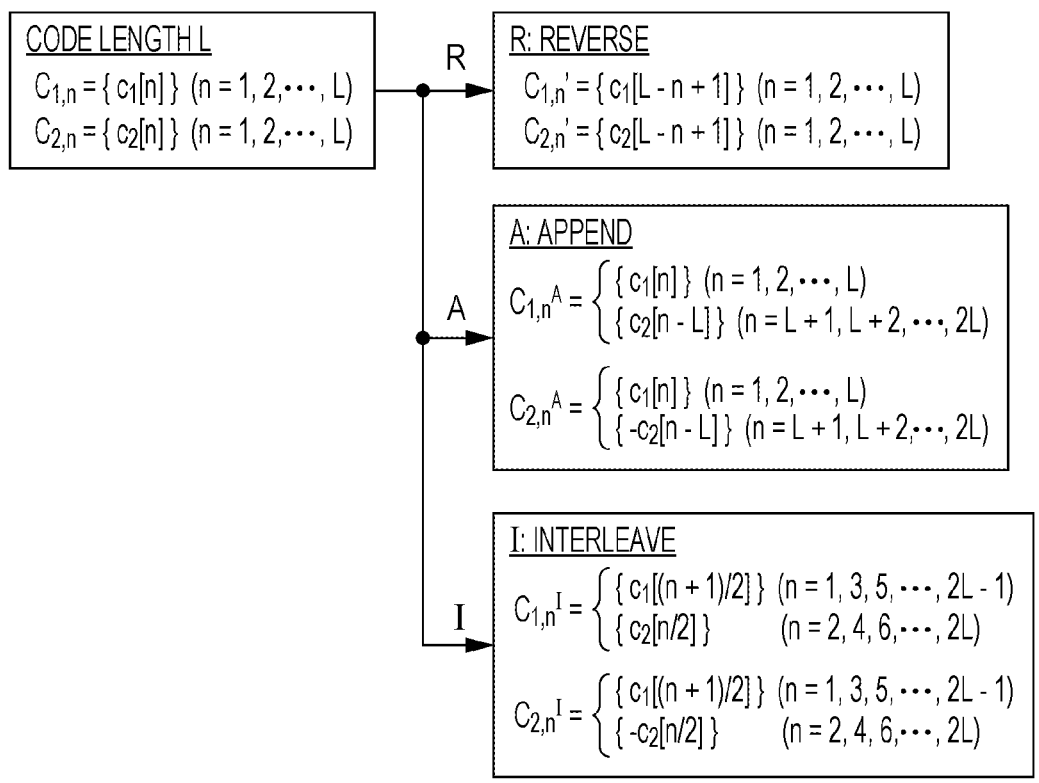
FIG. 7 depicts an example of a reverse process, an append process, and an interleave process according to one embodiment of the present disclosure.

FIG. 7 depicts an example of a reverse process (hereinafter referred to as "R"), an append process (hereinafter referred to as "A"), and an interleave process (hereinafter referred to as "I") for use in the code coupling process. Note that complementarity is kept even for codes after the reverse process, the append process, or the interleave process.

Step: 1

The basic code pair is (a, b). (a, b) may be any code pair as long as they are complementary codes. In the following, a case is described, by way of example, in which the code length of the basic code pair is 4 ($L_b=4$).

$a=[0, 0, 0, 1]$ $b=[1, 0, 1, 1]$

The code coupling processing unit 102 performs a reverse process on the basic code pair. The reverse process is a process of reversing source codes (refer to FIG. 7). Codes (a', b') obtained by the reverse process on the basic code pair are as follows.

$a'=[1, 0, 0, 0]$ $b'=[1, 1, 0, 1]$

Note that a sign (') represents a reverse process.

Step: 2

The code coupling processing unit 102 performs a code coupling process on the basic code pair (a, b) and reverse codes (a', b'). The code coupling process includes an interleave process and an append process. The code coupling processing unit 102 performs either one of an interleave process and an append process as a code coupling process to be performed at the same step. Note that a sign (−) in FIG. 7 represents sign inversion. By a code inversing process, 0 is converted into 1, and 1 is converted into 0. For example, codes ($a^I$, $b^I$) obtained by an interleave process on the basic code pair (a, b) are as follows.

$a^I$=[0, 1, 0, 0, 0, 1, 1, 1]

$b^I$=[0, 0, 0, 1, 0, 0, 1, 0]

Note that the superscript (I) represents an interleave process.

Also, codes ($a^a$, $b^a$) obtained by an append process on the basic code pair (a, b) are as follows.

$a^a$=[0, 0, 0, 1, 1, 0, 1, 1]

$b^a$=[0, 0, 0, 1, 0, 1, 0, 0]

Note that the superscript (a) represents an append process.

In the same way, the code coupling processing unit 102 performs a code coupling process on the reverse codes (a', b') by an interleave process or an append process.

Next, the code coupling processing unit 102 performs a reverse process on the codes obtained by the interleave process or the append process.

In the following, a code after the interleave/append process obtained in STEP: 2 is represented as an "I/A2 code", and a code after the reverse process on the I/A2 code is represented as a "R2 code". The code length (L) of each of the I/A2 code and the R2 code is L=$2L_b$.

Step: 3

The code coupling processing unit 102 performs an interleave process or an append process on the I/A2 code and the R2 code to obtain a code represented as an "I/A3 code". Furthermore, the code coupling processing unit 102 performs a reverse process on the I/A3 code to obtain a code represented as an "R3 code". The code length (L) of each of the I/A3 code and the R3 code is L=$4L_b$.

In a pulse code generation tree depicted in FIG. 6A, the code coupling processing unit 102 generates a complementary group by using codes corresponding to a branch of the last step (STEP: 3 in FIG. 6A). That is, the code coupling processing unit 102 generates one complementary group by using the I/A3 code and the R3 code surrounded by a two-dot chain line.

The code coupling processing unit 102 defines a code count in the complementary group (eight codes in FIG. 6B) as a complementary group code count (Ncp). For example, when the I/A3 codes and the R3 codes surrounded by the two-dot chain line are $A_1$, $B_1$, $A_1'$, and $B_1'$, a complementary group (1) {AB[1], AB[2], . . . , AB[8]} which is generated by the code coupling processing unit 102 is as follows.

{AB[1],AB[2], . . . ,AB[8]}={$A_1$,$B_1$,$B_1'$,$A_1'$,$B_1'$,$A_1$,$B_1'$}

In accordance with the above-described generation standards, the code coupling processing unit 102 generates a complementary group similarly from the codes corresponding to another branch. For generation of pulse codes belonging to each complementary group surrounded by a two-dot chain line in FIG. 6A, each code coupling process on the basic code pair is different.

With this, each complementary group is configured of codes twice as many as the code count (four at STEP: 3 in FIG. 6A) corresponding to each branch at the last step. That is, the pulse codes belonging to one complementary group include codes {A, B, B', A', B, A, A', B'} using codes {A, B} generated by the code coupling process and inverse codes {A', B'} of the codes {A, B}.

Note that the code coupling process of the code coupling processing unit 102 is assumed to be a process until a complementary group is generated. Also, the code coupling processing unit 102 may generate a complementary group by performing a similar code coupling process on another basic code pair other than the complementary codes {a, b}.

Also, in FIG. 6A and FIG. 6B, the code coupling process up to STEP: 3 is depicted, by way of example. However, by further repeatedly performing a code coupling process similar to STEP: 3, the code coupling processing unit 102 can generate codes with the code length L extended twice for every repetition.

The radar apparatus 100 transmits pulse codes in accordance with a transmission sequence of codes in the complementary groups depicted, for example, in FIG. 6B. That is, the radar apparatus 100 (the wireless transmitting unit 105) transmits all of the pulse codes belonging to one complementary group in a sequence of {A, B, B', A', B, A, A', B'}. With this, the radar apparatus 100 can obtain a range sidelobe suppressing effect even if a Doppler shift occurs due to movement of the target.

Figure 8:
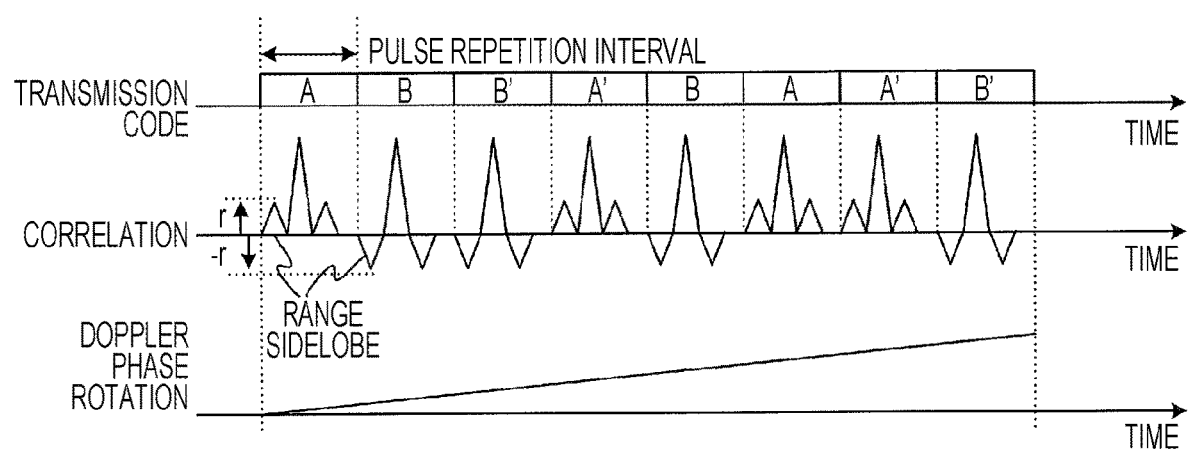
FIG. 8 depicts changes with time of correlation waveforms and Doppler phase rotation according to one embodiment of the present disclosure.

FIG. 8 depicts changes of correlation waveforms and Doppler phase rotation with time when the radar apparatus 100 transmits pulse codes in the transmission sequence of {A, B, B', A', B, A, A', B'}. In FIG. 8, the target moves with constant velocity. In this case, Doppler phase rotation changes in accordance with a linear line. With the radar apparatus 100 transmitting the pulse codes at constant pulse repetition intervals, a range sidelobe with its phase rotated by a Doppler shift is represented by the following Equation (1).

$$R=r\{1-\exp(j\phi)-\exp(j2\phi)+\exp(j3\phi)-\exp(j4\phi)+\exp(j5\phi)+\exp(j6\phi)-\exp(j7\phi)\}\approx 0 \quad (1)$$

Here, r represents a range sidelobe at each pulse repetition interval in a range bin concerned, and R represents a range sidelobe after coherent addition. Also, a phase rotation per pulse repetition interval is taken as $\phi$.

When $\phi$ represents a subtle phase rotation quantity, a range sidelobe is cancelled by coherent addition in the coherent adding unit 110, and R≈0 holds.

Note that, by setting the coherent addition count Nca at a multiple of the code count Ncp belonging to the complementary groups (a multiple of 8 in FIG. 8), the above-described range sidelobe cancelling effect can be obtained. Also, under a static environment where the target does not move, the present disclosure has a property that a range sidelobe is significantly suppressed by the coherent adding unit 110 performing coherent addition of all correlation values of codes generated from a certain combination of {basic code pair, code coupling process}.

<Operation of Radar Apparatus>

Next, the operation of the radar apparatus 100 is described.

Figure 9A:
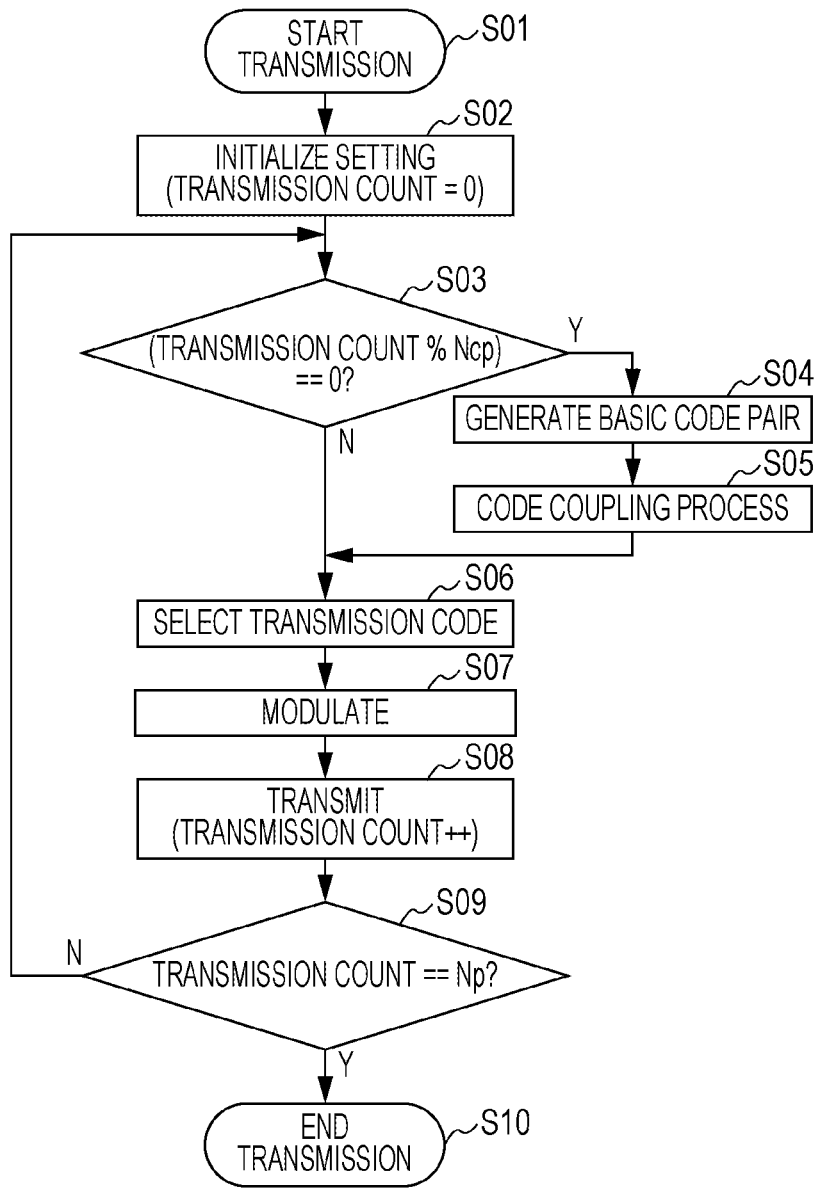
FIG. 9A depicts an example of a transmitting process flow of the radar apparatus according to one embodiment of the present disclosure.
Figure 9B:
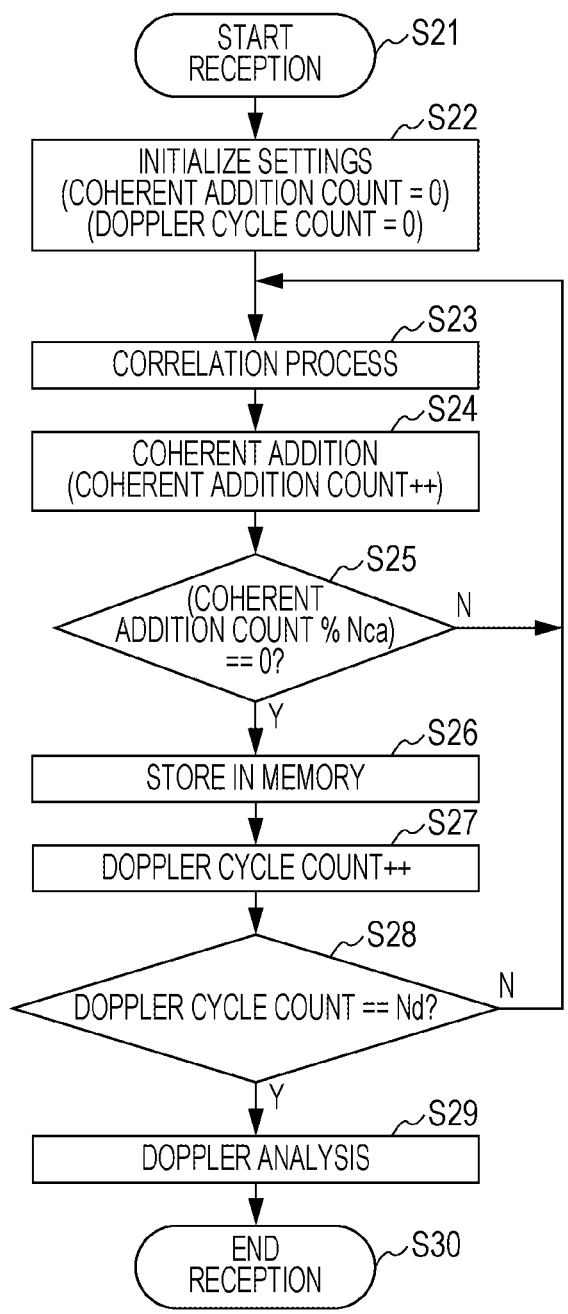
FIG. 9B depicts an example of a receiving process flow of the radar apparatus according to one embodiment of the present disclosure.

FIG. 9A (steps S01 to S10) is a flow diagram depicting an example of operation of a transmitting process of the radar apparatus 100. FIG. 9B (steps S21 to S30) is a flow diagram depicting an example of operation of a receiving process of the radar apparatus 100. In FIG. 9A and FIG. 9B, the procedure proceeds to a "Y" direction when a conditional expression holds, and the procedure proceeds to a "N" direction when a conditional expression does not hold.

First, the transmitting process of the radar apparatus 100 is described.

S01

Upon receiving an input of a measurement start signal, the radar apparatus 100 performs a transmission start process.

S02

The pulse transmission count counting unit 106 sets a transmission count at 0 at the start of measurement (setting initialization).

S03

The pulse transmission count counting unit 106 counts a transmission count of pulse codes from the start of transmission, and determines whether the remainder ("transmission count % Ncp") of the transmission count counted with Ncp (complementary group code count) as a divisor is 0. When the remainder is 0 (Y at step S03), the radar apparatus 100 proceeds to a process at step S04. On the other hand, when the remainder is not 0 (N at step S03), the radar apparatus 100 proceeds to a process at step S06.

That is, at step S03, the pulse transmission count counting unit 106 proceeds to a process at step S04 every time the transmission count of the pulse codes is a positive integral multiple of Ncp (complementary group code count).

S04

The basic code pair generating unit 101 generates a basic code pair.

S05

The code coupling processing unit 102 performs a code coupling process on the basic code pair generated at step S04. The codes obtained by the code coupling process are pulse code candidates to be transmitted by the radar apparatus 100.

At steps S04 and S05, the basic code pair generating unit 101 and the code coupling processing unit 102 change the basic code pair or the code coupling process to generate pulse code candidates. That is, the basic code pair generating unit 101 and the code coupling processing unit 102 select a different complementary group from a plurality of complementary groups every time the transmission count of the pulse codes is an integral multiple of the code count in the complementary group.

S06

From among the pulse code candidates generated at step S05, the code coupling processing unit 102 selects pulse codes of a complementary group to be transmitted. For example, the code coupling processing unit 102 selects pulse codes in a sequence of {A, B, B', A', B, A, A', B'} for one complementary group.

S07

The modulating unit 103 digitally modulates the pulse codes selected at step S06. The D/A converting unit 104 converts a digital modulated signal inputted from the modulating unit 103 into an analog modulated signal. The wireless transmitting unit 105 converts the analog modulated signal into a wireless signal.

S08

The wireless transmitting unit 105 transmits the wireless signal generated at step S07 to the wireless propagation path. The pulse transmission count counting unit 106 counts up a transmission count of the pulse codes.

S09

The pulse transmission count counting unit 106 determines whether the transmission count of the pulse codes is equal to a predetermined pulse transmission count (that is, the total number of pulse codes Np) of the radar apparatus 100. When the transmission count of the pulse codes is equal to Np (Y at step S09), the radar apparatus 100 proceeds to a process at step S10. On the other hand, when the transmission count of the pulse codes is not equal to Np (N at step S09), the radar apparatus 100 proceeds to a process at step S03.

S10

The radar apparatus 100 ends the transmitting process.

Next, the receiving process of the radar apparatus 100 is described.

S21

The radar apparatus 100 starts a receiving process. The wireless receiving unit 107 converts the echo signal received from the wireless propagation path into a baseband. The A/D converting unit 108 converts the analog reception signal to the digital reception signal.

S22

The radar apparatus 100 initializes settings regarding reception. Specifically, the coherent adding unit 110 sets the coherent addition count at 0, and the Doppler analyzing unit 111 sets the Doppler cycle count at 0.

S23

The correlating unit 109 performs a cross-correlating process on the digital reception signal generated at step S21 and inputted from the A/D converting unit 108 and the pulse codes used in the transmitting process at step S08 (FIG. 9A).

S24

The coherent adding unit 110 performs coherent addition of the correlation signal inputted at step S23 from the correlating unit 109 in synchronization with the pulse repetition interval. The coherent adding unit 110 counts up a coherent addition count.

S25

The coherent adding unit 110 determines whether the remainder (that is, coherent addition count % Nca, where % represents remainder arithmetic operation) of the coherent addition count counted up with Nca (predetermined coherent addition count) as a divisor is 0. When the remainder is 0 (Y at step S25), the radar apparatus 100 proceeds to a process at step S26. On the other hand, when the remainder is not 0 (N at step S25), the radar apparatus 100 proceeds to a process at step S23.

Note that Nca is a positive integral multiple of Ncp (complementary group code count). That is, the coherent adding unit 110 performs coherent addition of a correlation value of codes configuring the complementary group.

S26

The Doppler analyzing unit 111 stores coherent addition signals obtained at steps S23 to S25 in the memory.

S27

The Doppler analyzing unit 111 counts up a Doppler cycle count.

S28

The Doppler analyzing unit 111 determines whether the counted-up Doppler cycle count is equal to Nd (the predetermined Doppler cycle count). When the Doppler cycle count is equal to Nd (Y at step S28), the radar apparatus 100 proceeds to a process at step S29. On the other hand, when the Doppler cycle count is not equal to Nd (N at step S28), the radar apparatus 100 proceeds to a process at step S23.

S29

The Doppler analyzing unit 111 performs Doppler analysis on the coherent addition signals stored in the memory at step S26. The Doppler analyzing unit 111 outputs a target Doppler signal obtained by Doppler analysis.

S30

The radar apparatus 100 ends the receiving process.

<Pulse Code Transmission Sequence>

Figure 10A:
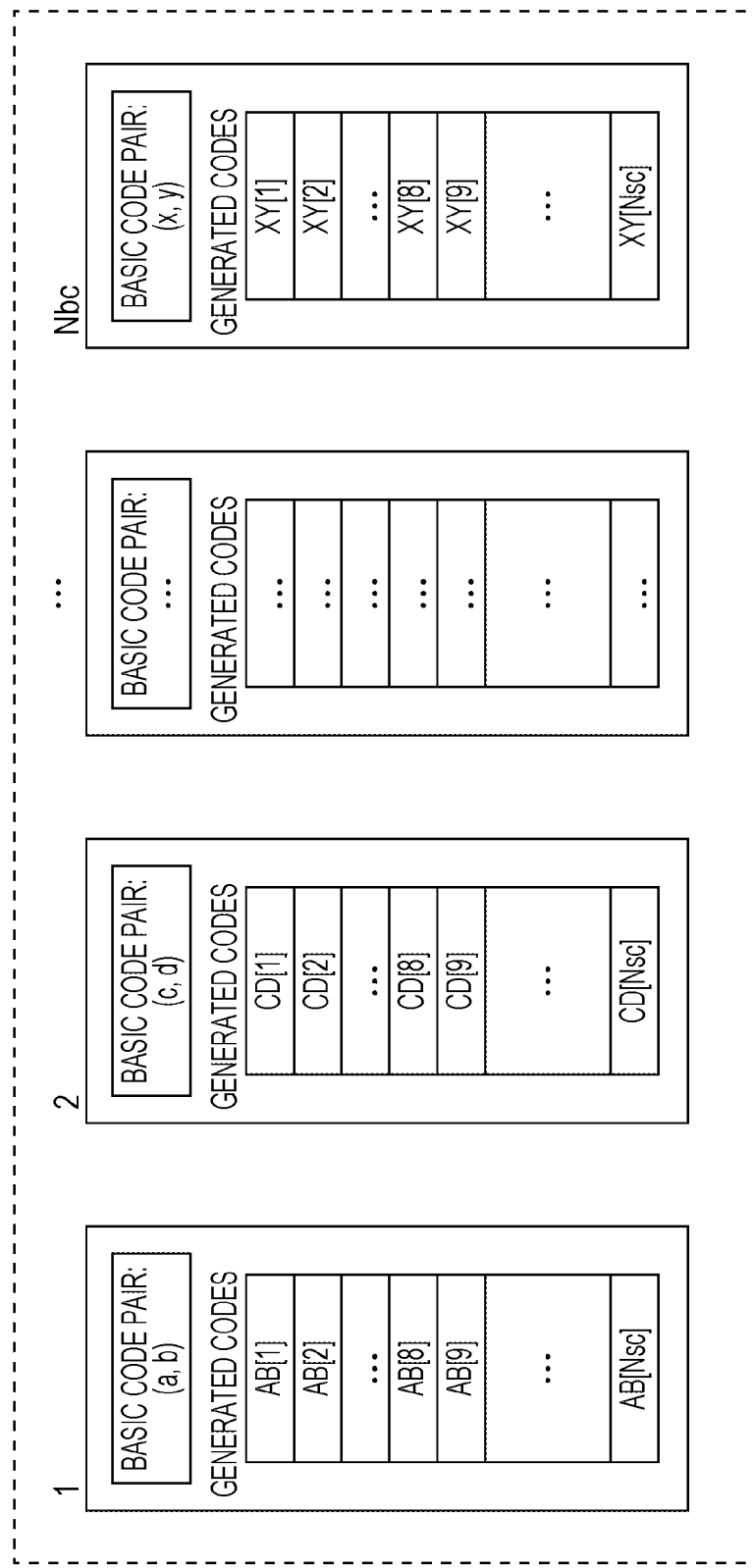
FIG. 10A depicts an example of basic code pairs according to one embodiment of the present disclosure.
Figure 10B:
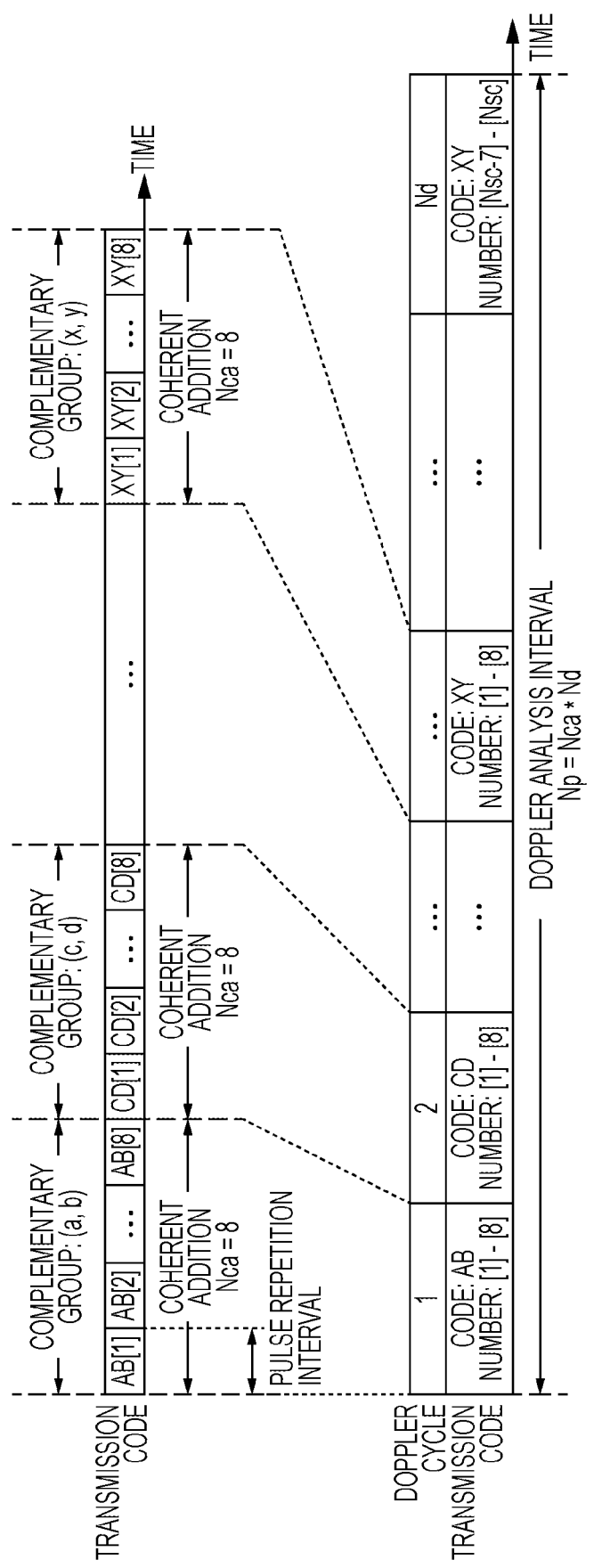
FIG. 10B depicts an example of a pulse code transmitting process according to one embodiment of the present disclosure.

FIG. 10A depicts an example of basic code pairs to be used by the radar apparatus 100 in transmission of pulse codes and codes generated from the basic code pairs. FIG. 10B depicts an example of a transmission sequence of pulse codes to be transmitted at the radar apparatus 100.

The radar apparatus 100 generates pulse code candidates to be transmitted by using Nbc basic code pairs (a, b), (c, d), . . . , (x, y). Note that Nbc basic code pairs may include same basic code pairs, or basic code pairs different from each other may be used for Nbc basic code pairs.

The radar apparatus 100 performs a code coupling process including a predetermined number of steps (for example, STEP: 3 in FIG. 6A) on the basic code pairs to generate pulse code candidates. Here, contents of the steps (interleave process and append process) in the code coupling process to be performed by the radar apparatus 100 on different basic code pairs may include same processes or different processes. On the other hand, when the radar apparatus 100 uses a same basic code pair, the radar apparatus 100 generates pulse codes with contents of the steps different from each other in the code coupling process.

That is, the radar apparatus 100 generates pulse codes by changing either one of {basic code pair, code coupling process} in the combination. With this, all generated pulse code candidates are different. That is, the number of combinations of {basic code pair, code coupling process} for use in the radar apparatus 100 is Nbc.

The radar apparatus 100 performs a code coupling process on each basic code pair. Here, the number of pulse codes generated by using each basic code pair is Nsc. Also, in the following, the radar apparatus 100 numbers the generated pulse codes as code numbers (1, 2, . . . , Nsc) for each basic code pair. For example, in FIG. 6B, Nsc=32 holds, and the radar apparatus 100 sequentially numbers in a sequence of pulse codes {Ax, Bx, Bx', Ax', Bx, Ax, Ax', Bx'} (where x=1, 2, 3, 4) configuring a complementary group.

The radar apparatus 100 selects pulse codes configuring a complementary group from among Nsc pulse codes generated by the code coupling process, and transmits the selected pulse codes. Here, the radar apparatus 100 sets a complementary group transmission sequence as a sequence with serial code numbers. For example, when selecting the complementary group (a, b), the radar apparatus 100 transmits in a sequence of codes AB[1], AB[2], . . . , and AB[8].

After transmitting the pulse codes for one complementary group, the radar apparatus 100 next transmits pulse codes of another complementary group in a sequence with serial code numbers (corresponding to steps S03 to S06 in FIG. 9A). Here, the radar apparatus 100 may select a complementary group with the same combination of {basic code pair, code coupling process} as the previous one, but may select a complementary group with either one of {basic code pair, code coupling process} changed. That is, a combination of a basic code pair and a code coupling process for generating a complementary group (first complementary group) for use in previous pulse code transmission may be different from a combination of a basic code pair and a code coupling process for generating a complementary group (second complementary group) for use in next pulse code transmission.

The radar apparatus 100 transmits pulse codes until the transmission count reaches the predetermined transmission count Np (=Nca×Nd) (corresponding to step S09 in FIG. 9A). Here, the radar apparatus 100 uses all of Nsc pulse codes generated from Nbc combinations of {basic code pair, code coupling process} (total code count=Nbc×Nsc) in Np pulse code transmissions (Np≥Nbc×Nsc).

Note that the radar apparatus 100 may redundantly transmit Nsc pulse codes generated from one combination of {basic code pair, code coupling process} within the total transmission count Np. However, among Nsc pulse code to be redundantly transmitted, the radar apparatus 100 has to transmit a pulse code with each code number at least once and the same number of times within the total transmission count Np.

For example, to transmit a pulse code with a code number m (m is any number from 1 to Nsc) s times (s is a positive integer), the radar apparatus 100 has to also transmit a pulse code with another code number n (n is any number from 1 to Nsc and n≠m) s times.

Pulse codes with different combinations of {basic code pair, code coupling process} have a property that a range sidelobe occurs in different range bins when the radar apparatus 100 performs coherent addition of correlation values of the complementary groups.

FIG. 11 depicts an example of waveforms obtained by the radar apparatus 100 performing a correlating process on complementary groups obtained by a code coupling process on the basic code pairs (a, b), (c, d), . . . , (x, y) and performing coherent addition of their correlation values. In FIG. 11, in different basic code pairs, range bins where a peak of the coherent addition value occurs are all the same. On the other hand, range bins where a range sidelobe occurs are different.

That is, in each coherent adding process, the radar apparatus 100 uses pulse codes with different combinations of {basic code pair, code coupling process}. With this, a range sidelobe occurs in a different range bin in a coherent addition value obtained by each coherent adding process. With this, since range sidelobes of coherent addition values as many as the Doppler cycle count (Nd) are dispersed in the range bin, cyclicity of range sidelobes in Doppler analysis of the radar apparatus 100 is suppressed. That is, with the radar apparatus 100 transmitting pulse codes by using the code transmission sequence of FIG. 10B, an effect of reducing noise occurring at the time of Doppler analysis can be obtained.

Also, the radar apparatus 100 selects a complementary group with either one of {basic code pair, code coupling process} changed every time the pulse codes for the complementary groups are transmitted, and transmits the pulse codes in the selected complementary group, thereby further randomizing cyclicity of range sidelobes. That is, the effect of reducing noise occurring at the time of Doppler analysis can be enhanced.

Furthermore, in the radar apparatus 100, range bins where a range sidelobe occurs tend to be different if, in a combination of {basic code pair, code coupling process}, a different basic code pair is used every time pulse codes for a complementary group are transmitted, rather than a different code coupling process is used.

Therefore, the radar apparatus 100 may use at least two or more basic code pairs. Also, a basic code pair for generating a complementary group (first complementary group) for use in previous pulse code transmission may be different from a basic code pair for generating a complementary group (second complementary group) for use in next pulse code transmission.

In the present code transmission sequence, the radar apparatus 100 transmits pulse codes in a serial sequence in the complementary group. With this, the radar apparatus 100 can obtain the range sidelobe suppressing effect represented by Equation (1) even if the target moves.

Also, pulse codes generated from each combination of {basic code pair, code coupling process} are transmitted at least once within the total transmission count Np and the same number of times. Therefore, the radar apparatus 100 can obtain the range sidelobe suppressing effect of the coherent addition result under a static environment where the target does not move.

Specific Example

Figure 12A:
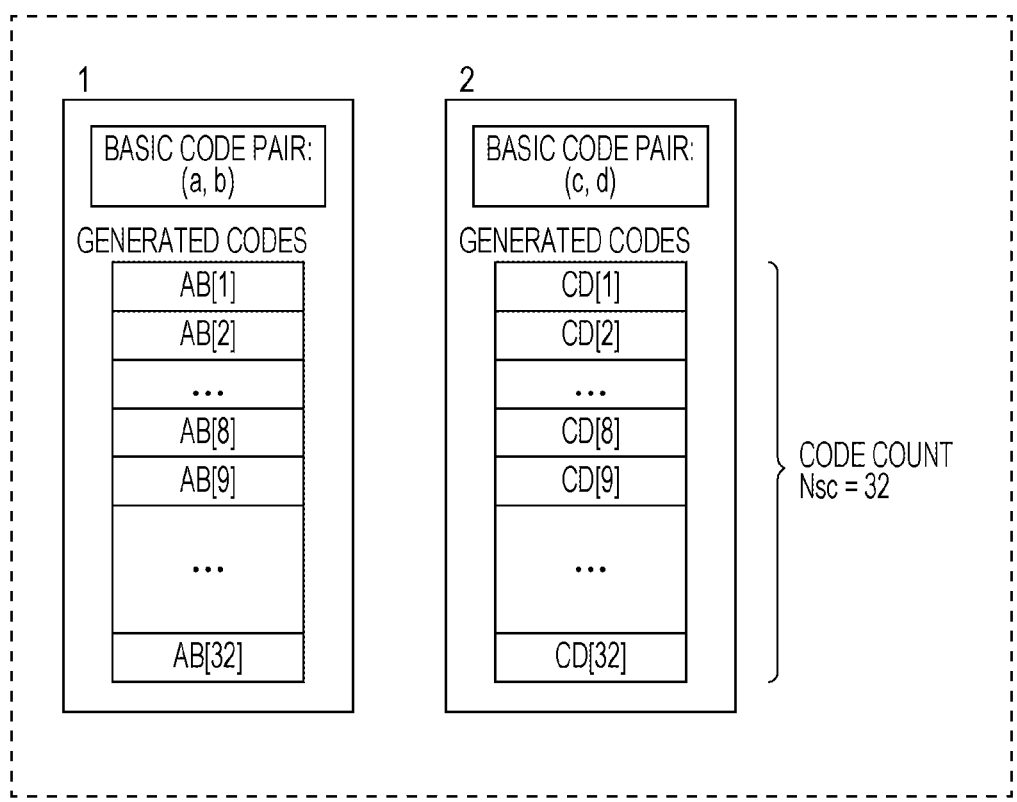
FIG. 12A depicts an example of a plurality of basic code pairs according to one embodiment of the present disclosure.
Figure 12B:
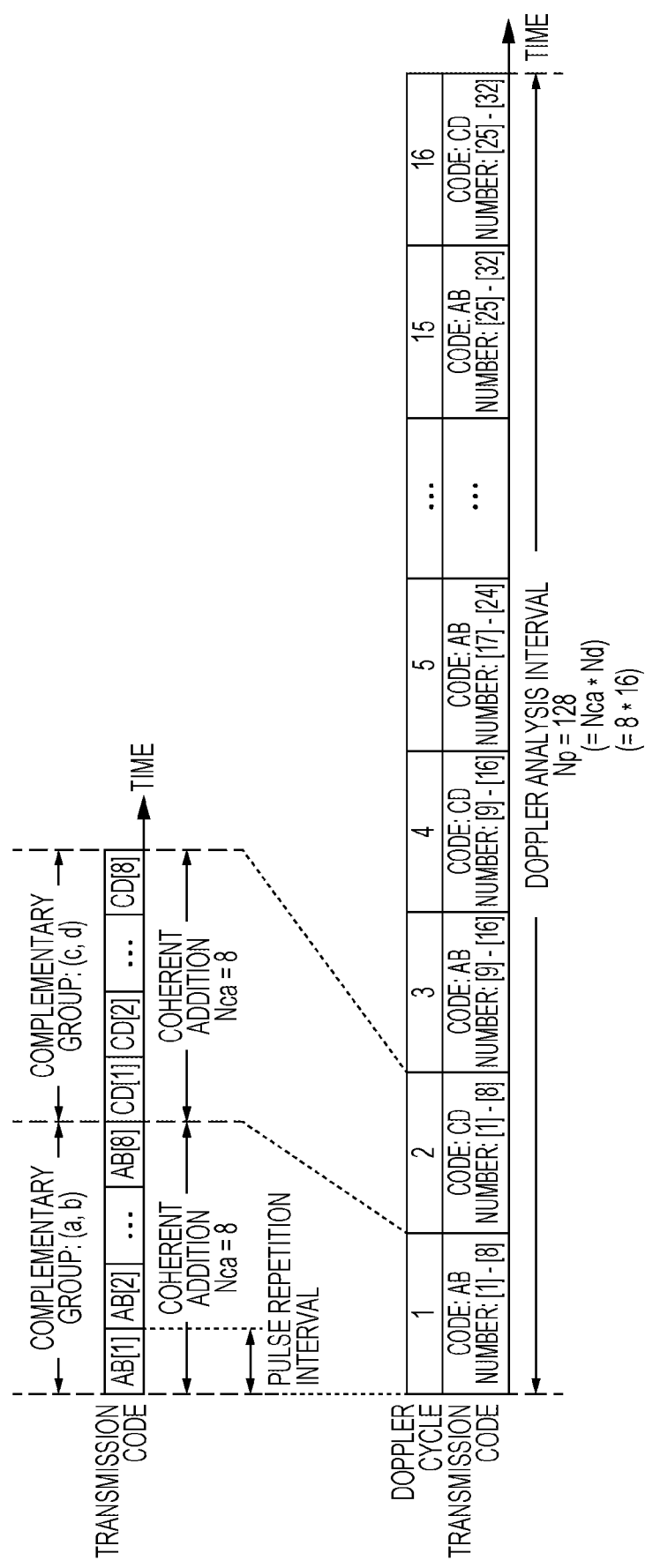
FIG. 12B depicts an example of a pulse code transmitting process according to one embodiment of the present disclosure.
Figure 13:
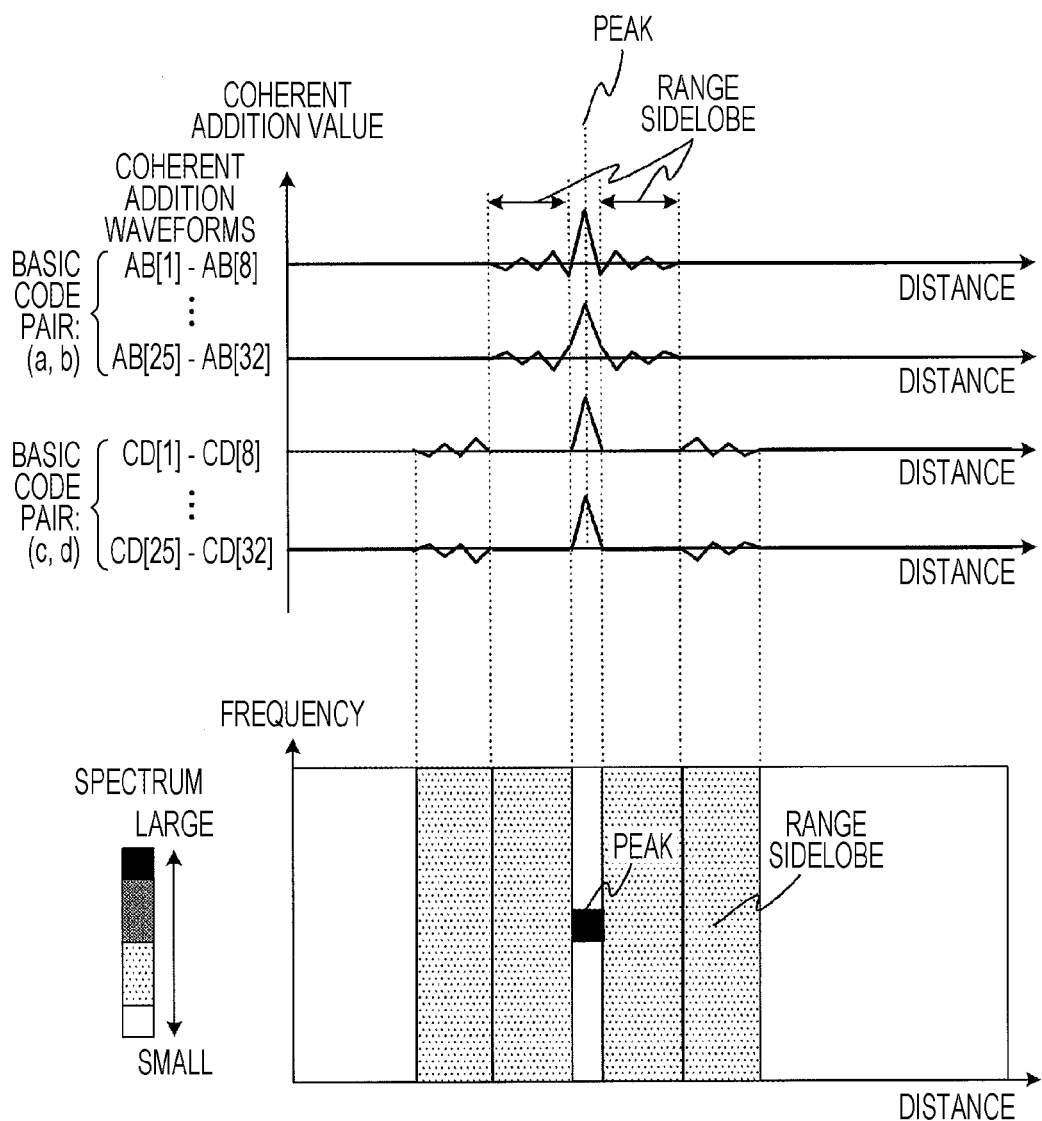
FIG. 13 depicts an example of a coherent addition value for each basic code pair according to one embodiment of the present disclosure.

Next, as a specific example, operation when the radar apparatus 100 uses two basic code pairs is described by using FIG. 12A, FIG. 12B, and FIG. 13.

FIG. 12A depicts basic code pairs (a, b) and (c, d) and codes generated from each of the basic code pairs (a, b) and (c, d). FIG. 12B depicts an example of a transmission sequence of pulse codes by using the basic code pairs (a, b) and (c, d).

In FIG. 12A and FIG. 12B, as with FIG. 1A and FIG. 1B, the code count Nsc generated from the basic code pairs (a, b) and (c, d) is 32, the coherent addition count Nca is 8, and the Doppler cycle count Nd is 16.

FIG. 13 depicts an example of a target Doppler signal obtained by the radar apparatus 100 performing a receiving process on the pulse codes transmitted in the transmission sequence depicted in FIG. 12B. In FIG. 13, for a target Doppler signal, the horizontal axis represents distance, the vertical axis represents frequency, and degrees of magnitude of a spectrum obtained by frequency analysis is represented as color fills.

The radar apparatus 100 transmits pulse codes generated from the basic code pairs (a, b) and (c, d) for each complementary group, performs a correlating process by using a reception echo signal, and performs coherent addition.

In waveforms after coherent addition depicted in FIG. 13, range bins where a range sidelobe occurs are dispersed. With the range bins where a range sidelobe occurs dispersed, spectrums obtained by Doppler analysis are also dispersed in a distance direction. With the range bins where a range sidelobe occurs dispersed, the magnitude of a range sidelobe component (spectrum) extracted by Doppler analysis is smaller compared with a case in which one basic code pair is used (for example, FIG. 2).

From the above, the radar apparatus 100 can suppress a noise component occurring due to a range sidelobe in a target Doppler signal.

Effects of the Present Embodiment

As has been described above, the radar apparatus 100 according to the present embodiment selects a different complementary group from among a plurality of complementary groups every time the transmission count of the pulse codes is an integral multiple of the code count Ncp in the complementary group, and transmits pulse codes belonging to the selected complementary group.

With this, since the radar apparatus 100 can perform a Doppler analyzing process by reducing a range sidelobe component, noise after Doppler analysis can be reduced.

With this, according to the present embodiment, the radar apparatus 100 can detect a target with high accuracy.

Other Modification Examples

Also, part of the structure of the radar apparatus described above may be physically separated from the other parts. In that case, each part may include a communicating unit for mutual communication.

While various embodiments have been described above with reference to the drawings, it goes without saying that the present disclosure is not restricted to these examples. It is evident that a person skilled in the art can conceive various change examples and correction examples within the scope of the claims, and it is understood that these examples naturally belong to the technical scope of the present disclosure. Also, the components in the above embodiment may be combined in any manner within a scope not deviating the gist of the disclosure.

Also, while the above embodiment of the present disclosure is described as being configured by hardware, the present disclosure can be achieved by software in conjunction with hardware.

Furthermore, each functional block for use in description of the above embodiment is achieved typically as an LSI, which is an integrated circuit having an input terminal and an output terminal. The integrated circuit may control each functional block for use in description of the embodiment and may include an input terminal and an output terminal. These may be each individually made in one chip, or may be partially or entirely included in one chip. While the chip is described herein as an LSI, this may be referred to as an IC, a system LSI, a super LSI, or an ultra LSI depending on difference of the degree of integration.

Still further, the integrated circuit methodology is not restricted to LSIs, but may be achieved by dedicated circuits or general-purpose processors. A field programmable gate array (FPGA) programmable after LSI manufacture or a reconfigurable processor in which connection and settings of circuit cells inside an LSI are reconfigurable may be used.

Yet still further, if an integrated circuit technology which can replace LSIs emerges with development of semiconductor technology or another derivative technology, it goes without saying that functional block integration may be performed by using that integrated circuit technology. There is a possibility of applying biotechnology.

<Gist of the Present Disclosure>

The radar apparatus of the present disclosure includes a counter which counts a transmission count of pulse codes from start of measurement, a pulse code generator which selects a complementary group from among a plurality of complementary groups obtained by grouping a plurality of pulse codes generated by at least one code coupling process on at least one basic code pair as complementary codes every time the transmission count is an integral multiple of a code count in the plurality of complementary groups, and a transmitter which transmits the pulse codes belonging to the selected complementary group.

In the radar apparatus of the present disclosure, pulse codes belonging to one of the plurality of complementary groups include codes {A, B, B', A', B, A, A', B'} using codes {A, B} generated by the code coupling process and inverse codes {A', B'} of the codes {A, B}, and the transmitter transmits all of the pulse codes belonging to the one of the plurality of complementary groups in a sequence of {A, B, B', A', B, A, A', B'}.

In the radar apparatus of the present disclosure, after sequentially transmitting the pulse codes belonging to a first complementary group, the transmitter sequentially transmits the pulse codes belonging to a second complementary group, the plurality of complementary groups including the first complementary group and the second complementary group, and a combination of a first basic code pair and a first code coupling process for generating the first complementary group is different from a combination of a second basic code pair and a second code coupling process for generating the second complementary group, the at least one code coupling process including the first code coupling process and the second code coupling process, and the at least one basic code pair including the first basic code pair and the second basic code pair.

In the radar apparatus of the present disclosure, after sequentially transmitting the pulse codes belonging to a first complementary group, the transmitter sequentially transmits the pulse codes belonging to a second complementary group, the plurality of complementary groups including the first complementary group and the second complementary group, and a first basic code pair for generating the first complementary group is different from a second basic code pair for generating the second complementary group, the at least one basic code pair including the first basic code pair and the second basic code pair.

In the radar apparatus of the present disclosure, each of the pulse codes belonging to the plurality of complementary groups is transmitted at least once within a total transmission count of the pulse codes in the measurement by the radar apparatus and a same number of times.

The radar method of the present disclosure includes counting a transmission count of pulse codes from start of measurement, selecting a complementary group from among a plurality of complementary groups obtained by grouping a plurality of pulse codes generated by at least one code coupling process on at least one basic code pair as complementary codes every time the transmission count is an integral multiple of a code count in the plurality of complementary groups, and transmitting the pulse codes belonging to the selected complementary group.

The present disclosure is useful as a radar apparatus capable of detecting a target with high accuracy.

What is claimed is:

1. A radar apparatus comprising:
   a pulse code generator which, in operation, stores a plurality of pulse codes generated by a code coupling process on a plurality of basic code pairs, and selects Nd different a plurality of complementary groups of the pulse codes for transmission in a plurality of Doppler cycles, respectively Nbc indicating a number of the basic code pairs, Ncp indicating a number of the pulse codes included in each of the Nsc indicating a number of the pulse codes generated for each of the basic code pairs and being an integer multiple of Ncp, Nd indicating a number of the Doppler cycle count cycles and being an integral multiple of Nbc, and Nsc Nbc,. and Ncp each being an integer greater than or equal to 2;
   a transmitter which, in operation, transmits a different one of the complementary groups of the pulse codes selected by the pulse code generator in each of the Doppler cycles, a first one of the basic code pairs used to generate the pulse codes in one of the complementary groups of the pulse codes transmitted in one of the Dopplere being different from a second one of the basic code pairs used to generate the pulse codes in two of the complementary groups of the pulse codes respectively transmitted in two of the Doppler cycles that are adjacent to the one of the Doppler cycles;
   a correlating circuit coupled to the pulse code generator, wherein the correlating circuit, in operation, outputs a correlation signal obtained by performing a cross-correlating process based each of the complementary groups of the pulse codes transmitted by the transmitter and an echo signal; and
   a coherent adding circuit coupled to the correlating circuit, wherein the coherent adding circuit, in operation, performs coherent addition of a plurality of autocorrelation values of the pulse codes based on the correlation signal output by the correlating circuit, Nca indicating a number of autocorrelation values coherently added by the coherent adding circuit during each of the Doppler cycles, Nca being an integer greater than or equal to 2, and Nca being an integral multiple of Ncp.

2. The radar apparatus according to claim 1, wherein Nca is equal to 8, and the pulse code generator generates one of the plurality of complementary groups of the pulse codes by including eight complementary Spano codes {A, B, B', A', B, A, A', B'} using two complementary Spano codes {A, B} generated by the code coupling process and two inverse complementary Spano codes {A', B'} of the two complementary Spano codes {A, B}.

3. The radar apparatus according to claim 1, wherein the transmitter transmits each of the pulse codes at least once and a same number of times within a Doppler analysis interval in a measurement by the radar apparatus.

4. The radar apparatus according to claim 1, wherein the pulse codes, when transmitted, produce a plurality of range sidelobes in a plurality of range bins, respectively.

5. A radar method comprising:
   storing a plurality of pulse codes generated by a code coupling process on a plurality of basic code pairs;
   selecting a plurality of complementary groups of the pulse codes for transmission in plurality of Doppler cycles, respectively, Nbc indicating a number of the basic code pairs, Ncp indicating a number of the pulse codes included in each of the complementary groups, Nsc indicating a number of the pulse codes generated for each of the basic code pairs and being an integer multiple of Ncp, Nd indicating a number of the Doppler cycles and being an integral multiple of Nbc, and Nsc Nbc, and Ncp each being an integer greater than or equal to 2;
   transmitting a different one of the complementary groups of the pulse codes selected by the selecting in each of the Doppler cycles, a first one of the basic code pairs used to generate the pulse codes in one of the complementary groups of the pulse codes transmitted in a one of the Doppler cycles being different from a second one of the basic code pairs used to generate the pulse codes in two of the complementary groups of the pulse codes respectively transmitted in two of the Doppler cycles that are adjacent to the one of the Doppler cycles;
   outputting a correlation signal obtained by performing a cross-correlating process based each of the complementary groups of the pulse codes transmitted by the transmitting and an echo signal; and
   performing coherent addition of a plurality of autocorrelation values of the pulse codes based on the correlation signal output by the outputting, Nca indicating a number of autocorrelation values coherently added by the coherent adding circuit during each of the Doppler cycles, Nca being an integral multiple of Ncp, and Nca being an integer greater than or equal to 2.

6. The radar method according to claim 5, wherein Nca is equal to 8, and the generating includes generating one of the complementary groups of the pulse codes by including eight complementary Spano codes {A, B, B', A', B, A, A', B'} using two complementary Spano codes {A, B} generated by the code coupling process and two inverse complementary Spano codes {A', B'} of the two complementary Spano codes {A, B}.

7. The radar method according to claim 5, wherein
the transmitting includes transmitting each of the pulse codes at least once and a same number of times within a Doppler analysis interval in a measurement by a radar apparatus.

8. The radar method according to claim 5, wherein
the pulse codes, when transmitted, produce a plurality of range sidelobes in a plurality of range bins, respectively.

* * * * *